US006502465B1

(12) United States Patent
Vedapuri et al.

(10) Patent No.: US 6,502,465 B1
(45) Date of Patent: Jan. 7, 2003

(54) DETERMINING GAS AND LIQUID FLOW RATES IN A MULTI-PHASE FLOW

(75) Inventors: Damo Vedapuri, Chennai (IN); Madan Gopal, Columbus, OH (US)

(73) Assignee: Ohio University, Athens, OH (US)

( * ) Notice: Subject to any disclaimer, the term of this patent is extended or adjusted under 35 U.S.C. 154(b) by 19 days.

(21) Appl. No.: 09/669,135

(22) Filed: Sep. 26, 2000

Related U.S. Application Data

(60) Provisional application No. 60/156,154, filed on Sep. 27, 1999.

(51) Int. Cl.$^7$ ................................................. G01F 1/74

(52) U.S. Cl. ................................. 73/861.04; 73/861.06

(58) Field of Search ........................... 73/861.06, 861.04, 73/61.44, 861.02, 861.03, 861.12, 861.14, 861.15, 861.23–861.31; 137/393, 372, 171

(56) References Cited

U.S. PATENT DOCUMENTS

| | | |
|---|---|---|
| 3,940,985 A | 3/1976 | Wyler |
| 4,109,523 A | 8/1978 | Teyssandier |
| 4,162,630 A | 7/1979 | Johnson |
| 4,282,433 A | 8/1981 | Loffel |
| 4,317,178 A | 2/1982 | Head |
| 4,402,230 A | 9/1983 | Raptis |
| 4,545,244 A | 10/1985 | Yasuda et al. |

(List continued on next page.)

FOREIGN PATENT DOCUMENTS

| | | |
|---|---|---|
| EP | 0 360 449 A2 | 9/1988 |
| EP | 0 605 944 A2 | 7/1994 |
| EP | 0 639 776 A1 | 2/1995 |

OTHER PUBLICATIONS

Michael J. Riezenman, "Ultrasonic Meters Go With the Flow", Mechanical Engineering, Sep. 1989, pp. 74–77.

(List continued on next page.)

Primary Examiner—Benjamin R. Fuller
Assistant Examiner—Charlene Dickens
(74) Attorney, Agent, or Firm—Killworth, Gottman, Hagan & Schaeff, L.L.P.

(57) ABSTRACT

A method and apparatus for determining gas and liquid flow rates in a multi-phase flow are provided. In accordance with one embodiment of the present invention, a method of determining gas and liquid flow rates in a multi-phase flow is provided. The method utilizes a set of gas phase ultrasonic transducers and a set of liquid phase ultrasonic transducers positioned to direct ultrasonic signals through the multi-phase flow. The method comprising the steps of: (i) establishing a set of gas phase control parameters and a gas phase algorithm for determining a flow rate of a gaseous portion of the multi-phase flow, wherein the gas phase control parameters define a gas phase ultrasonic signal characterized by a gas phase center frequency and a gas phase bandwidth and the gas phase algorithm comprises at least one of a gas phase transit time algorithm and a gas phase cross correlation algorithm; (ii) establishing a set of liquid phase control parameters and a liquid phase algorithm for determining a flow rate of a liquid portion of the multi-phase flow, wherein the liquid phase control parameters define a liquid phase ultrasonic signal characterized by a liquid phase center frequency and a liquid phase bandwidth and the liquid phase algorithm comprises a liquid phase cross correlation algorithm; (iii) controlling the gas phase ultrasonic transducers according to the gas phase control parameters so as to transmit the gas phase ultrasonic signal; (iv) analyzing the gas phase ultrasonic signal according to the gas phase algorithm; (v) controlling the liquid phase ultrasonic transducers according to the liquid phase control parameters so as to transmit a liquid phase ultrasonic signal; (vi) analyzing the liquid phase ultrasonic signal according to the liquid phase algorithm; and (vii) determining the gas and liquid flow rates based upon the analyses of the gas phase ultrasonic signal and the liquid phase ultrasonic signal.

32 Claims, 4 Drawing Sheets

U.S. PATENT DOCUMENTS

| | | | |
|---|---|---|---|
| 4,599,892 | A | 7/1986 | Doshi |
| 4,628,725 | A | 12/1986 | Gouilloud et al. |
| 4,646,575 | A | 3/1987 | O'Hair et al. |
| 4,914,959 | A | 4/1990 | Mylvaganam et al. |
| 4,975,645 | A | 12/1990 | Lucas |
| 5,025,160 | A | 6/1991 | Watt |
| 5,036,710 | A | 8/1991 | King |
| 5,224,482 | A | 7/1993 | Nikoonahad et al. |
| 5,228,347 | A | 7/1993 | Lowell et al. |
| 5,367,911 | A | 11/1994 | Jewell et al. |
| 5,456,120 | A | 10/1995 | Simonian |
| 5,513,535 | A | 5/1996 | Mayranen et al. |
| 5,589,642 | A | 12/1996 | Agar et al. |
| 5,591,922 | A | 1/1997 | Segeral et al. |
| 5,594,181 | A | 1/1997 | Stange |
| 5,597,962 | A | 1/1997 | Hastings et al. |
| 5,600,073 | A | 2/1997 | Hill |
| 5,654,551 | A | 8/1997 | Watt et al. |
| 5,714,691 | A | 2/1998 | Hill |
| 5,719,329 | A | 2/1998 | Jepson et al. |
| 5,741,978 | A | 4/1998 | Gudmundsson |
| 5,787,049 | A | 7/1998 | Bates |
| 5,792,962 | A | 8/1998 | Constant et al. |
| 5,818,735 | A | 10/1998 | Tigwell et al. |
| 5,837,902 | A | 11/1998 | Veneruso et al. |
| 5,869,771 | A | 2/1999 | Rajan et al. |
| 5,948,995 | A | 9/1999 | Veneruso et al. |
| 6,009,380 | A | 12/1999 | Vecchio et al. |
| 6,047,602 | A | 4/2000 | Lynnworth |
| 6,209,388 | B1 * | 4/2001 | Letton et al. ............... 73/61.79 |

OTHER PUBLICATIONS

Roger N. Blais, Assoc. Professor—Dept. of Engineering Physics, The University of Tulsa; "Void Fraction Instrumentation System on Three Inch Two–Phase Flowline", ISA, 1982; pp. 883–889.

J.E. laurinat, T.J. Hanratty and W.P. Jepson; "Film Thickness Distribution for Gas–Liquid Annular Flow in a Horizontal Pipe", PCH PhysicoChemical Hydromatics, vol. 6, No. 1/2, pp 179–195, 1985.

S.L. Moriss and A.D. Hill, U. of Texas, Measurement of Velocity Profiles in Upwards Oil/Water Flow Using Ultrasonic Doppler Velocimetry; SPE 22766, 1991 SPE Annl. Tech. Conf., pp. 65–79.

Y.A. Hassan, T.K. Blanchat, C.H. Seeley Jr. and R.E. Canaan, "Simultaneous Velocity Measurements of Both Components of a Two–Phase flow Using Particle Image Velocimetry"; Int. J. Multiphase Flow. vol. 18. No. 3. pp. 371–395. 1992.

Joseph Baumoel, President of Controlotron, "Comparative Advantages of Clamp–On Transmit–Time Ultrasonic Flowmeters Over Conventional Intrusive Flowmeters", 1993 All rights Reserved, pp. 1–4.

Report by Victoria Thomas entitled "New Technology Revolutionises Gas Metering", Gas Engineering & Management, May 1994, pp. 115–116.

W.J. Priddy, Field Trials of Multiphase Metering Systems at Prudhoe Bay, Alaska, SPE 28514, Presentation at 69th Annual Tech. Conference, Sep. 25–28, 1994.

Michael Rogi, "Ultrasonic Measurement for Mainline Applications", Gas Industries, Nov. 1994; pp. 19–20.

S. Neogi, A. Lee & W.P. Jepson, A Model for Multiphase (Gas–Water–Oil) Stratified Flow in Horizontal Pipelines, SPE 28799, presentation at SPE Asia Pacific Oil & Gas Conference, Nov., 1994; pp. 553–560.

"Adaptive Phase Doppler Velocimeter Gives Particle Size and Velocity", vol. 4, Issue 1, TSI Incorporated, Fluid Mechanics Instrument Division, p. 1 (no date available).

J.K. Sidney, Dr. J. Coulthard and Dr. R.P. Keech, "Cross Correlation Flow Measurement in Two–Phase Air–Water Mixtures", 18 pages.

V. Kefer, W. Kratzer, B. Brand and W. Kastner, "Measurement Techniques for Two–Phase Flow—Survey and Development of a New Mass Flow Meter", 24 pages.

Dr. B.C. Millington and N.W. King, "Development of a Jet Mixer/Turbine Meter Package for Metering Gas–Liquid Mixtures", 24 pages.

Dr. Ing U. Wernekinck, "Installation for Calibrating, Under Operating Conditions of Turbine Gas Meters", 26 pages.

Dr. T.L. Jones, "Gas Flow Rate Measurement Using the Helium Dilution Technique", 19 pages.

Joshi, Shrinivas G.; Jin, Yu USA; "Application of a Surface–Acoustic–Wave Device for Measurement of Liquid Flow Rate", IEEE Transactions of Ultrasonics, Ferroelectrics, and Frequency Control, vol. 37, Sep. 1990, pp. 475–477 (abstract only).

S.L. Morriss, "Ultrasonic Imaging and Velocimetry in Two–Phase Pipe Flow", American Society of Mechanical Engineers (Paper), published by ASME, 1990; presentation at Energy–Sources Technology Conference and Exhibition held Jan. 14–18, 1990 (abstract only).

S.G. Foster, P.M. Embree, W.D. O'Brien, Flow Felocity Profile via Time–Domain Correlation: Error Control, vol. 37, May 1990, pp. 164–175 (abstract only).

G. A. Jackson, J.R. Gibson and R. Holmes, "Three–Path Ultrasonic Flow Meter With Fluid Velocity Profile Identification", Measurement Science & Technology, vol. 2, No. 7, Jul. 1991, pp. 635–642 (abstract only).

Steve Brown, "Level Measurement. Reaching New Peaks?" Process Engineering (London), vol. 71, No. 7, Jul. 1990, pp. 37–38 (abstract only).

Author: Anonymous, "Oklahoma Natural Evaluates Multipath Ultrasonic Meter", Gas Industries (Park Ridge, IL), 39, Nov., 1994, pp. 17–18 (abstract only).

Author: Anonymous; "Ultrasonic Flow Meters", Pipeline and Gas Journal, vol. 217, No. 10, Oct. 1990.

Web page http://www.secondwavesystems.com/systems.html, "Non–Contact Analyzer, the NCA 1000", Second Wave, Jun. 15, 2000.

* cited by examiner

DETERMINING GAS AND LIQUID FLOW RATES IN A MULTI-PHASE FLOW

CROSS-REFERENCE TO RELATED APPLICATIONS

This application claims the benefit of U.S. Provisional Application Serial No. 60/156,154, filed Sep. 27, 1999.

BACKGROUND OF THE INVENTION

The present invention relates to multi-phase pipelines wherein multiple fluid phases flow through a single pipeline and, more particularly, to the determination of the flow rates and film heights of the different fluid phases flowing within the pipeline.

In a variety of industrial and experimental applications, it is necessary to monitor the flow of a collection of fluids in a pipeline. For example, in the oil and gas industry, distinct fluid phases, e.g, a liquid phase and a gaseous or vapor phase, exist in horizontal pipelines. Multi-phase flow metering, wherein the velocity and flow rate of each fluid phase flowing within a pipeline is metered, presents the potential for a valuable tool for the oil and gas industry. Many of the conventional multi-phase flow metering systems do not provide an accurate indication of the flow rate of each fluid phase flowing within a pipeline because of inherent limitations in their methodology. Further, other conventional systems are prohibitively difficult to install or incorporate intrusive metering arrangements requiring interruption or alteration of the multi-phase flow. Finally, many conventional systems are merely compatible with a limited range of pipeline designs and, accordingly, have limited utility.

Accordingly, there is a need for a multi-phase flow metering system and method incorporating a non-intrusive, versatile, accurate, readily installable, and cost effective multi-phase fluid metering design.

BRIEF SUMMARY OF THE INVENTION

This need is met by the present invention wherein an improved method and apparatus for determining gas and liquid flow rates in a multi-phase flow are provided. In accordance with one embodiment of the present invention, a method of determining gas and liquid flow rates in a multi-phase flow is provided. The method utilizes a set of gas phase ultrasonic transducers and a set of liquid phase ultrasonic transducers positioned to direct ultrasonic signals through the multi-phase flow. The method comprising the steps of: (i) establishing a set of gas phase control parameters and a gas phase algorithm for determining a flow rate of a gaseous portion of the multi-phase flow, wherein the gas phase control parameters define a gas phase ultrasonic signal characterized by a gas phase center frequency and a gas phase bandwidth and the gas phase algorithm comprises at least one of a gas phase transit time algorithm and a gas phase cross correlation algorithm; (ii) establishing a set of liquid phase control parameters and a liquid phase algorithm for determining a flow rate of a liquid portion of the multi-phase flow, wherein the liquid phase control parameters define a liquid phase ultrasonic signal characterized by a liquid phase center frequency and a liquid phase bandwidth and the liquid phase algorithm comprises a liquid phase cross correlation algorithm; (iii) controlling the gas phase ultrasonic transducers according to the gas phase control parameters so as to transmit the gas phase ultrasonic signal; (iv) analyzing the gas phase ultrasonic signal according to the gas phase algorithm; (v) controlling the liquid phase ultrasonic transducers according to the liquid phase control parameters so as to transmit a liquid phase ultrasonic signal; (vi) analyzing the liquid phase ultrasonic signal according to the liquid phase algorithm; and (vii) determining the gas and liquid flow rates based upon the analyses of the gas phase ultrasonic signal and the liquid phase ultrasonic signal.

The method may further comprise the steps of: establishing the gas phase control parameters for a plurality of sets of the gas phase ultrasonic transducers such that the gas phase control parameters define a plurality of gas phase ultrasonic signals; establishing the liquid phase control parameters for a plurality of sets of the liquid phase ultrasonic transducers such that the liquid phase control parameters define a plurality of liquid phase ultrasonic signals; and analyzing the gas phase and the liquid phase ultrasonic signals with the aid of an ultrasonic data selection terminal, wherein the ultrasonic data selection terminal is controlled so as to establish a dwell time for each set of the plurality of sets of ultrasonic transducers.

The method may further comprise the step of establishing the gas phase control parameters for a plurality of sets of the gas phase ultrasonic transducers such that the gas phase control parameters define a plurality of gas phase ultrasonic signals. The method may also comprise the step of analyzing the gas phase ultrasonic signals with the aid of an ultrasonic data selection terminal, wherein the ultrasonic data selection terminal is controlled so as to establish a dwell time for each set of the plurality of sets of the gas phase ultrasonic transducers.

The method may further comprising the step of establishing the liquid phase control parameters for a plurality of sets of the liquid phase ultrasonic transducers such that the liquid phase control parameters define a plurality of liquid phase ultrasonic signals. The liquid phase ultrasonic signals may be analyzed with the aid of an ultrasonic data selection terminal, wherein the ultrasonic data selection terminal is controlled so as to establish a dwell time for each set of the plurality of sets of the liquid phase ultrasonic transducers.

The method may further comprise the step of analyzing the liquid phase ultrasonic signals according to a plurality of liquid phase algorithms with the aid of an ultrasonic data selection terminal, wherein the ultrasonic data selection terminal is controlled so as to establish a dwell time for each algorithm of the plurality of liquid phase algorithms. The gas phase ultrasonic signals may be analyzed according to a plurality of gas phase algorithms with the aid of an ultrasonic data selection terminal, wherein the ultrasonic data selection terminal is controlled so as to establish a dwell time for each algorithm of the plurality of gas phase algorithms.

The method may further comprise the step of analyzing the liquid phase ultrasonic signals according to a plurality of sets of liquid phase control parameters with the aid of an ultrasonic data selection terminal, wherein the ultrasonic data selection terminal is controlled so as to establish a dwell time for each set of the plurality of sets of liquid phase control parameters. Similarly, the method may further comprise the step of analyzing the gas phase ultrasonic signals according to a plurality of sets of gas phase control parameters with the aid of an ultrasonic data selection terminal, wherein the ultrasonic data selection terminal is controlled so as to establish a dwell time for each set of the plurality of sets of gas phase control parameters.

The liquid phase algorithm may further comprise a liquid phase pulse echo mode algorithm. The step of establishing the gas phase algorithm may be characterized by a preference for the gas phase cross correlation algorithm over the gas phase transit time algorithm as an amount of liquid in the multi-phase flow increases.

The multi-phase flow may be contained within a pipeline, the gas phase ultrasonic signal is transmitted by coupling the set of gas phase ultrasonic transducers to an exterior surface of the pipeline, the liquid phase ultrasonic signal may be transmitted by coupling the set of liquid phase ultrasonic transducers to the exterior surface of the pipeline.

The gas phase ultrasonic signal may also be transmitted by coupling the set of gas phase ultrasonic transducers to an exterior surface of the pipeline. The set of gas phase ultrasonic transducers may comprise at least one upstream gas phase ultrasonic transducer and at least one downstream gas phase ultrasonic transducer positioned on opposite sides of a central longitudinal axis of the pipeline. The liquid phase ultrasonic signal may be transmitted by coupling the set of liquid phase ultrasonic transducers to an exterior surface of the pipeline. The set of liquid phase ultrasonic transducers may comprise at least one upstream liquid phase ultrasonic transducer and at least one downstream liquid phase ultrasonic transducer positioned on a common side of the central longitudinal axis of the pipeline. The set of gas phase ultrasonic transducers may comprise at least one upstream gas phase ultrasonic transducer and at least one downstream gas phase ultrasonic transducer positioned on a common side of a central longitudinal axis of the pipeline.

The gas phase center frequency may represent a compromise between unacceptable signal divergence at frequencies below or near 100 kHz and unacceptable signal attenuation at frequencies above or near 1 MHz.

In accordance with another embodiment of the present invention, a method of determining gas and liquid flow rates in a multi-phase flow contained within a pipeline is provided. The method utilizes a plurality of sets of gas phase ultrasonic transducers and a plurality of sets of liquid phase ultrasonic transducers positioned to direct ultrasonic signals through the multi-phase flow. The method comprises the steps of: (i) establishing a set of gas phase control parameters for the sets of the gas phase ultrasonic transducers such that the gas phase control parameters define a plurality of gas phase ultrasonic signals; (ii) establishing a gas phase algorithm for determining a flow rate of a gaseous portion of the multi-phase flow, wherein the gas phase control parameters define gas phase ultrasonic signals characterized by respective gas phase center frequencies and gas phase bandwidths and the gas phase algorithm comprises at least one of a gas phase transit time algorithm and a gas phase cross correlation algorithm; (iii) establishing a set of liquid phase control parameters for the plurality of sets of the liquid phase ultrasonic transducers such that the liquid phase control define a plurality of liquid phase ultrasonic signals; (iv) establishing a liquid phase algorithm for determining a flow rate of a liquid portion of the multi-phase flow, wherein the liquid phase control parameters define liquid phase ultrasonic signals characterized by respective liquid phase center frequencies and liquid phase bandwidths and the liquid phase algorithm comprises a liquid phase cross correlation algorithm; (v) coupling the set of gas phase ultrasonic transducers to an exterior surface of the pipeline, wherein the set of gas phase ultrasonic transducers comprise at least one upstream gas phase ultrasonic transducer and at least one downstream gas phase ultrasonic transducer; (vi) controlling the gas phase ultrasonic transducers according to the gas phase control parameters so as to transmit the gas phase ultrasonic signals; (vii) analyzing the gas phase ultrasonic signals according to the gas phase algorithm with the aid of an ultrasonic data selection terminal, wherein the ultrasonic data selection terminal is controlled so as to establish a dwell time for each set of the plurality of sets of gas phase ultrasonic transducers; (viii) coupling the set of liquid phase ultrasonic transducers to an exterior surface of the pipeline wherein the set of liquid phase ultrasonic transducers comprise at least one upstream liquid phase ultrasonic transducer and at least one downstream liquid phase ultrasonic transducer; (ix) controlling the liquid phase ultrasonic transducers according to the liquid phase control parameters so as to transmit the liquid phase ultrasonic signals; (x) analyzing the liquid phase ultrasonic signals according to the liquid phase algorithm with the aid of the ultrasonic data selection terminal, wherein the ultrasonic data selection terminal is controlled so as to establish a dwell time for each set of the plurality of sets of liquid phase ultrasonic transducers; and (xi) determining the gas and liquid flow rates based upon the analyses of the gas phase ultrasonic signals and the liquid phase ultrasonic signals.

In accordance with yet another embodiment of the present invention, a system for determining gas and liquid flow rates in a multi-phase flow contained within a pipeline is provided. The system comprises a plurality of sets of gas and liquid phase ultrasonic transducers and a flow rate analyzer. The gas phase ultrasonic transducers are coupled to an exterior surface of the pipeline and comprise at least one upstream gas phase ultrasonic transducer and at least one downstream gas phase ultrasonic transducer. The liquid phase ultrasonic transducers are coupled to an exterior surface of the pipeline and comprise at least one upstream liquid phase ultrasonic transducer and at least one downstream liquid phase ultrasonic transducer. The flow rate analyzer is programmed to (i) establish a set of gas phase control parameters for the plurality of sets of gas phase ultrasonic transducers such that the gas phase control parameters define a plurality of gas phase ultrasonic signals, (ii) establish a gas phase algorithm for determining a flow rate of a gaseous portion of the multi-phase flow, wherein the gas phase control parameters define gas phase ultrasonic signals characterized by respective gas phase center frequencies and gas phase bandwidths and the gas phase algorithm comprises at least one of a gas phase transit time algorithm and a gas phase cross correlation algorithm (iii) establish a set of liquid phase control parameters for the plurality of sets of the liquid phase ultrasonic transducers such that the liquid phase control parameters define a plurality of liquid phase ultrasonic signals; (iv) establish a liquid phase algorithm for determining a flow rate of a liquid portion of the multi-phase flow, wherein the liquid phase control parameters define liquid phase ultrasonic signals characterized by respective liquid phase center frequencies and liquid phase bandwidths and the liquid phase algorithm comprises a liquid phase cross correlation algorithm; (v) control the gas phase ultrasonic transducers according to the gas phase control parameters so as to transmit the gas phase ultrasonic signals; (vi) analyze the gas phase ultrasonic signals according to the gas phase algorithm with the aid of an ultrasonic data selection terminal, wherein the ultrasonic data selection terminal is controlled so as to establish a dwell time for each set of the plurality of sets of gas phase ultrasonic transducers;(vii) control the liquid phase ultrasonic transducers according to the liquid phase control parameters so as to transmit the liquid phase ultrasonic signals; (viii) analyze the liquid phase ultrasonic signals according to the liquid phase algorithm with the aid of the ultrasonic data selection terminal, wherein the ultrasonic data selection terminal is controlled so as to establish a dwell time for each set of the plurality of sets of liquid phase ultrasonic transducers; and (ix) determine the gas and liquid flow rates based upon the analyses of the gas phase ultrasonic signals and the liquid phase ultrasonic signals.

Accordingly, it is an object of the present invention to provide an improved scheme for determining gas and liquid flow rates in a multi-phase flow. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION

Figure 1:
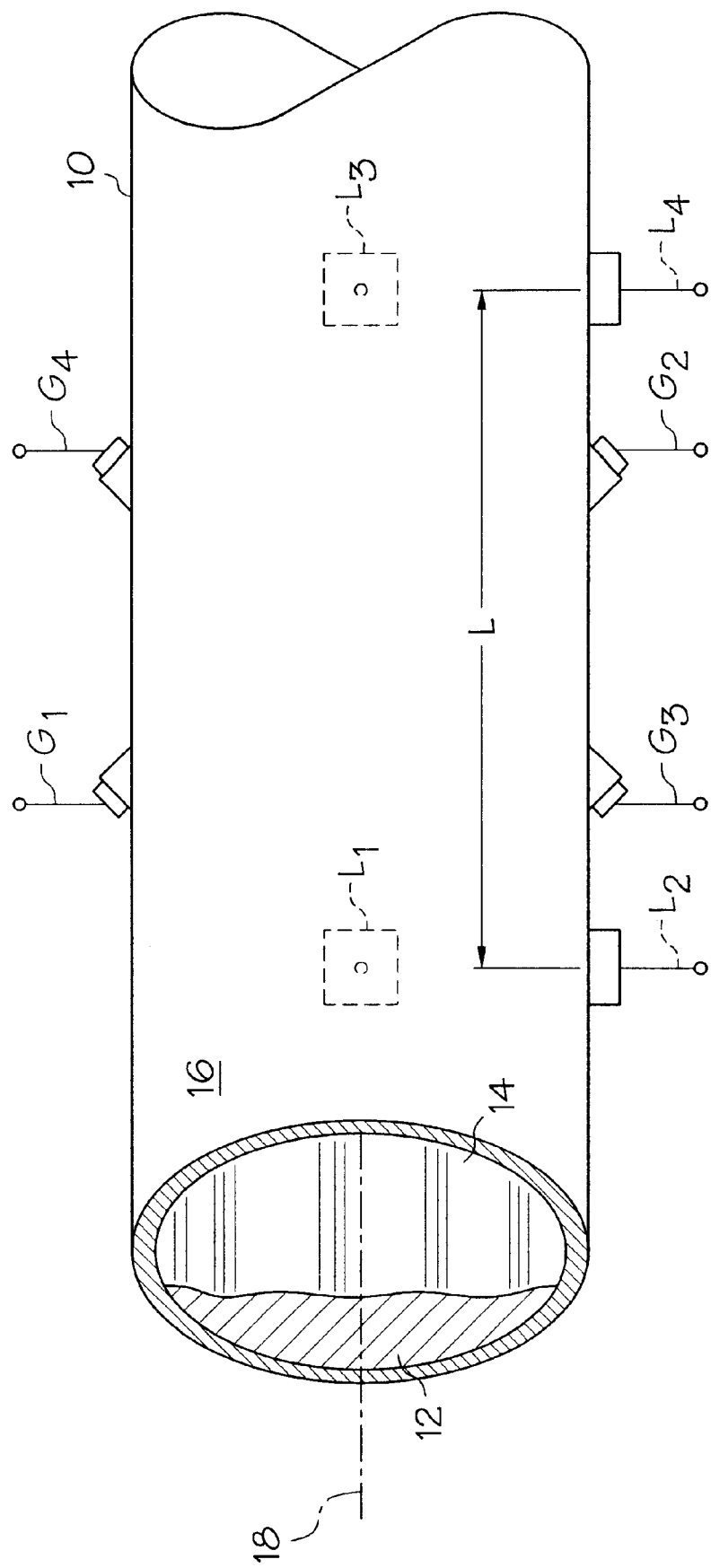
FIG. 1 is a schematic top view of a transducer arrangement according to the present invention illustrated in the context of a multi-phase flow contained within a pipeline.
Figure 2:
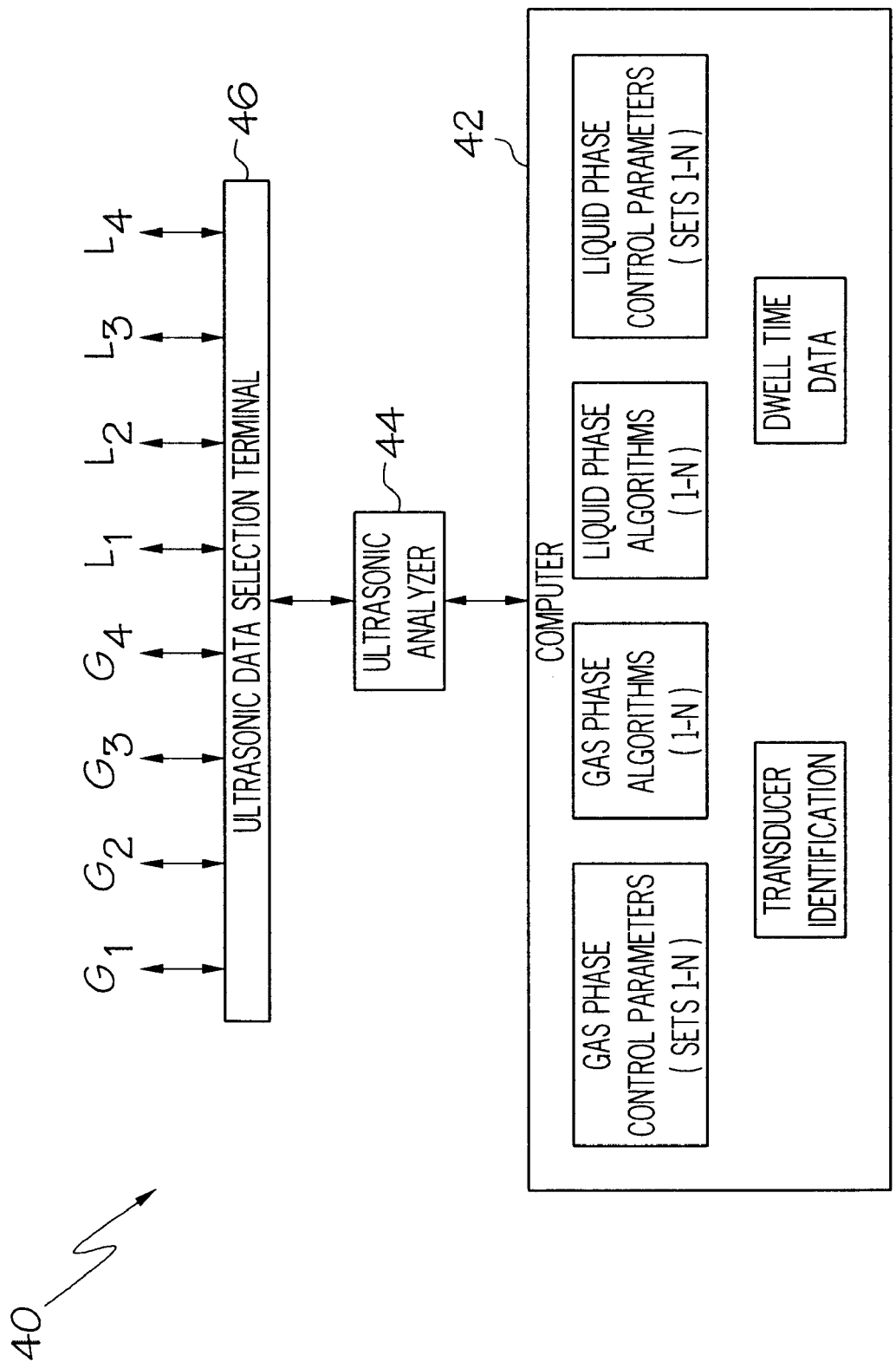
FIG. 2 is a system block diagram illustrating a system and method for determining gas and liquid flow rates in a multi-phase flow according to the present invention.

Referring now to FIGS. 1 and 2, a system and method for determining gas and liquid flow rates in a multi-phase flow contained within a pipeline 10 is described. The multi-phase flow illustrated in FIG. 1 includes a liquid portion 12 and a gas or vapor portion 14. The pipeline 10 is illustrated as a top view. As is illustrated in FIG. 1, the system and method utilize a plurality of gas phase ultrasonic transducers $G_1$, $G_2$, $G_3$, and $G_4$ positioned on opposite sides of the pipeline 10 and a plurality of liquid phase ultrasonic transducers $L_1$, $L_2$, $L_3$, and $L_4$ positioned on the bottom and on one side of the pipeline 10. In this manner, the transducers are positioned to direct ultrasonic signals through the multi-phase flow contained within the pipeline 10.

The sets of transducers are mounted directly on the exterior surface 16 of the pipeline 10 and are coupled to a flow rate analyzer 40, see FIG. 2, which is programmed to determine gas and liquid flow rates of the multi-phase flow based upon an analysis of gas and liquid phase ultrasonic signals directed through the multi-phase flow. For the purposes of describing and defining the present invention, it is noted that ultrasonic signals are understood to comprise any signals above 20 kHz.

The flow rate analyzer 40 typically comprises a specially programmed computer 42 coupled to an ultrasonic analyzer 44 and an ultrasonic data selection terminal 46 but may comprise a single integrated component or a variety of different components arranged to execute the functions described herein. According to one embodiment of the present invention, the ultrasonic data selection terminal 46 comprises a multiplexing unit and the ultrasonic analyzer 44 comprises a non-contact analyzer available from Second-Wave Systems of Boalsburg, Pa., USA under the product name NCA 1000. The NCA 1000 is a high frequency non-contact non-destructive analyzer that may be utilized to measures thickness and velocity of a variety of materials including gas and liquid portions of a multi-phase flow. The NCA 1000 is offered as a one channel (direct transmission mode) or as a four channel (direct transmission and reflection mode) system. The NCA 1000 has a dynamic range on the order of about 130 dB and an accuracy between ±1 ns and ±50 ns.

The NCA 1000 design is based upon advanced image processing technology similar to that used for radar. Unlike conventional ultrasonic systems, it synthesizes an optimal transducer impulse response using a swept frequency chirp. The chirp signal is a short, e.g., 600 $\mu$s, sinusoidal ultrasonic pulse or tone burst in which the frequency is swept between fixed limits during the time period of transmission. The NCA 1000 offers quantitative evaluation of frequency dependent attenuation and dispersion. The standard NCA 1000 system uses two transducers to form a four channel system that collects data from two transmission and reflection modes. According to the present invention, as will be described in further detail below, the ultrasonic data selection terminal 46 is employed to analyze successive gas and liquid phase ultrasonic signals from successive sets of a plurality of sets of transducers. The data selection terminal 46 may also be employed to enable selective application of particular sets of control parameters to selected or successive sets of transducers and to enable selective application of phase algorithms to signals coming from selected or successive sets of transducers.

As an alternative to using the NCA 1000 for the ultrasonic analyzer 44, other conventional spiked and high energy ultrasonic pulse receiver instruments may be used to facilitate measurement of the thickness and velocity of the gas and liquid portions of the multi-phase flow. For example, a suitable pulse receiver board is available from Matec Instruments of Northboro, Mass., USA.

According to the present invention, initially, suitable transducer control parameters and flow rate determination algorithms are established. More specifically, a set of gas phase control parameters is established for one or more sets of gas phase ultrasonic transducers. The gas phase control parameters will define the gas phase ultrasonic signals to be generated by the corresponding set of gas phase transducers.

In the illustrated embodiment, two sets of gas phase transducers are illustrated.

One set includes gas phase transducers $G_1$ and $G_2$ and another set includes gas phase transducers $G_3$ and $G_4$. These transducers are identified as sets because, according to one embodiment of the present invention, a signal generated at one transducer in the set will be detected at the other transducer in the set, and vice versa. It is contemplated by the present invention that any two transducers may form a set and that a signal may be generated and detected at a single transducer.

As is illustrated in FIG. 1, the gas phase ultrasonic transducers comprise one or more upstream transducers $G_1$, $G_3$ and one or more downstream transducers $G_2$, $G_4$. The flow rate analyzer 40 may be operated such that the upstream gas phase ultrasonic transducer within a particular set of transducers is positioned on the opposite side of a central longitudinal axis 18 of the pipeline 10 from the downstream gas phase ultrasonic transducer of the set of transducers. Alternatively, the flow rate analyzer 40 may be operated such that the upstream transducer and the downstream transducer within a selected transducer set are positioned on a common side of the central longitudinal axis 18.

Typically, a common set of control parameters is established for each set of gas phase transducers. However, it is contemplated that a different set of control parameters may be established for each set of gas phase transducers to increase accuracy in determining the flow rate of the gas phase. Further, distinct sets of control parameters may be selected for individual transducers in each set of transducers. The specific control parameters are established for the gas phase transducers to define gas phase ultrasonic signals characterized by respective gas phase center frequencies and gas phase bandwidths. The gas phase center frequency is preferably above about 225 kHz and below about 1 MHz. The gas phase bandwidth is set at a value above about 225 kHz. The value of the gas phase center frequency represents a compromise between unacceptable signal divergence at frequencies below or near 100 kHz and unacceptable attenuation at frequencies above or near 1 MHz. Accordingly, improved diagnostics are achievable if the center frequency is established at about 500 kHz and the gas phase bandwidth is set at about 300 kHz.

A gas phase algorithm is established and is utilized to process the gas phase ultrasonic signals to enable determination of a flow rate of a gaseous portion of the multi-phase flow. The gas phase algorithm may comprise a gas phase transit time algorithm or a gas phase cross correlation algorithm. The cross correlation algorithm becomes the more preferred algorithm as the amount of liquid in the pipeline increases. Each of these algorithms are described in more detail herein.

Similarly, a set of liquid phase control parameters is established for one or more sets of liquid phase ultrasonic transducers. The liquid phase control parameters will define the liquid phase ultrasonic signals to be generated by the corresponding set of liquid phase transducers. In the illustrated embodiment, two sets of liquid phase transducers are illustrated. One set includes liquid phase transducers $L_1$ and $L_3$ and another set includes liquid phase transducers $L_2$ and $L_4$. These transducers are identified as sets because a signal generated at one transducer in the set will be detected at the other transducer in the set, and vice versa. It is contemplated by the present invention that any two transducers may form a set and that a signal may be generated and detected at a single transducer. In certain preferred embodiments of the present invention, the distance L is a value between d and 4d, where d is the diameter of the pipeline 10.

At least two different configurations are possible for liquid low rate measurement. In one configuration, liquid phase transducers $L_1$ and $L_3$, located at the bottom of the pipeline 10. Each transducer is utilized to generate a signal indicative of the film height profile of the liquid portion 12 as a function of time. The profiles are then correlated to generate a representation of the flow rate of the liquid. Alternatively, a first pair of transducers may be placed diametrically opposite one another in the same cross section and a second pair of transducers may be placed diametrically opposite each other in another cross section. Signals from the first pair of transducers are utilized to generate a signal indicative of the film height profile of the liquid portion 12 as a function of time. Similarly, signals from the second pair of transducers are utilized to generate a signal indicative of the film height profile of the liquid portion 12 as a function of time. These profiles are then correlated to generate a representation of the flow rate of the liquid.

As is illustrated in FIG. 1, the liquid phase ultrasonic transducers comprise one or more upstream transducers $L_1$, $L_2$ and one or more downstream transducers $L_3$, $L_4$. The flow rate analyzer 40 may be operated such that the upstream liquid phase ultrasonic transducer within a particular set of transducers is positioned on the opposite side of the central longitudinal axis 18 of the pipeline 10 from the downstream liquid phase ultrasonic transducer of the set of transducers. Alternatively, the flow rate analyzer 40 may be operated such that the upstream transducer and the downstream transducer within a selected transducer set are positioned on a common side of the central longitudinal axis 18.

Typically, a common set of control parameters is established for each set of liquid phase transducers. However, it is contemplated that a different set of control parameters may be established for each set of liquid phase transducers to increase accuracy in determining the flow rate of the liquid phase. Further, distinct sets of control parameters may be selected for individual transducers in each set of transducers. The specific control parameters are established for the liquid phase transducers to define liquid phase ultrasonic signals characterized by respective liquid phase center frequencies and liquid phase bandwidths. Preferably, the liquid phase center frequency is established at a value between about 0.5 MHz and about 5 MHz. The liquid phase bandwidth is typically established at a value that is about 30% to about 80% of the value of the liquid phase center frequency and is preferably above about 300 kHz. Accordingly, the gas phase control parameters and the liquid phase control parameters are established such that the gas phase center frequency is substantially less than the liquid phase center frequency.

A liquid phase algorithm is established and is utilized to process the liquid phase ultrasonic signals to enable determination of a flow rate of a liquid portion of the multi-phase flow. The liquid phase algorithm typically comprises a liquid phase cross correlation algorithm. As is described in further detail herein, film thickness can be an important part of flow rate determination. Accordingly, where the film thickness is unknown, the set of liquid phase control parameters and the liquid phase algorithm are established to enable determination of a film thickness of said liquid portion of said multi-phase flow. According to one embodiment of the present invention, a liquid phase pulse echo mode algorithm, described in further detail below, is utilized to determine film thickness.

In operation, the gas phase ultrasonic transducers are controlled according to the gas phase control parameters so as to transmit the gas phase ultrasonic signals. The gas phase ultrasonic signals are analyzed, typically after passing through at least a portion of the multi-phase flow, according to the particular gas phase algorithm established. Where a plurality of gas phase transducer sets are employed, the ultrasonic data selection terminal 46 is controlled so as to establish a dwell time during which data may be gathered from signals transmitted and received by a selected gas phase transducer set. Data is automatically gathered from a subsequent transducer set, liquid phase or gas phase, when the dwell time lapses.

In operation, the liquid phase ultrasonic transducers are controlled according to the gas phase control parameters so as to transmit the liquid phase ultrasonic signals. The liquid phase ultrasonic signals are analyzed, typically after passing through at least a portion of the multi-phase flow, according to the particular liquid phase algorithm established. Where a plurality of liquid phase transducer sets are employed, the ultrasonic data selection terminal 46 is controlled so as to establish a dwell time during which data may be gathered from signals transmitted and received by a selected liquid phase transducer set. Data is automatically gathered from a subsequent transducer set, liquid phase or gas phase, when the dwell time lapses. Generally, the dwell time is between about one second and about five seconds for sets of the gas and liquid phase ultrasonic transducers.

The ultrasonic data selection terminal 46 may also be employed to switch analysis between different algorithms and sets of control parameters, in addition to switching analysis between sets of transducers. Respective dwell times may be established for each different algorithm, each set of control parameters, and each set of transducers.

The gas and liquid flow rates are determined based upon the analysis of the gas phase ultrasonic signals and the liquid phase ultrasonic signals. The flow rates are calculated from the respective flow velocities and cross sectional areas of the gas and liquid phases. Although the cross correlation and transit time algorithms are particularly well-suited for supplying phase velocity data utilized in the flow rate determination, a variety of alternative conventional algorithms may also be employed in accordance with the present invention. Reference is also made to U.S. Pat. No. 5,719,329, the disclosure of which is incorporated herein by reference for a discussion of a suitable method for determining the velocity and thicknesses of fluids moving within the pipeline 10.

Transit Time Algorithm

According to the transit time technique, a pulse of ultrasonic signal is transmitted in the upstream and down stream directions and the transmission time is noted. The difference in transit time is then related to the velocity as, $$\Delta t = \frac{2V_f d\cos\theta}{c^2}$$

where $\Delta t$=difference in transit times, $V_f$=fluid velocity (m/s), d=distance between the transducers, q=angle of inclination of the sound beam to axial direction, and c=velocity of sound (m/s).

Cross Correlation Algorithm

According to the cross-correlation technique, two pairs of transducers are placed on the pipe, separated by a known distance L and the media is interrogated continuously. The cross-correlation function is defined as $$R = \frac{1}{\Delta t} \int_0^{\Delta f} (x_{t-\tau} \cdot y_t) dt$$

where, $\Delta t$ is the time interval in which interrogation is carried out, $\tau$ is the time delay that is progressively varied in steps, $x_{t-\tau}$ is the upstream signal at time t-$\tau$, and $y_t$ is the downstream signal at time t.

The cross-correlation function R reaches a maximum when the time delay $\tau$ has a value $\tau^*$ which is the time taken for the tag to move from upstream to downstream. The velocity of the fluid $V_f$ is then given by $$V_f = \frac{L}{\tau^*}$$

Pulse Echo Mode Algorithm

According to the pulse echo technique, film thickness may be calculated according to the following equation $$L = \frac{t \cdot c}{2}$$

where L is the film thickness, t is the total time of flight, and c is the velocity of sound.

Transducer Design

Figure 3:
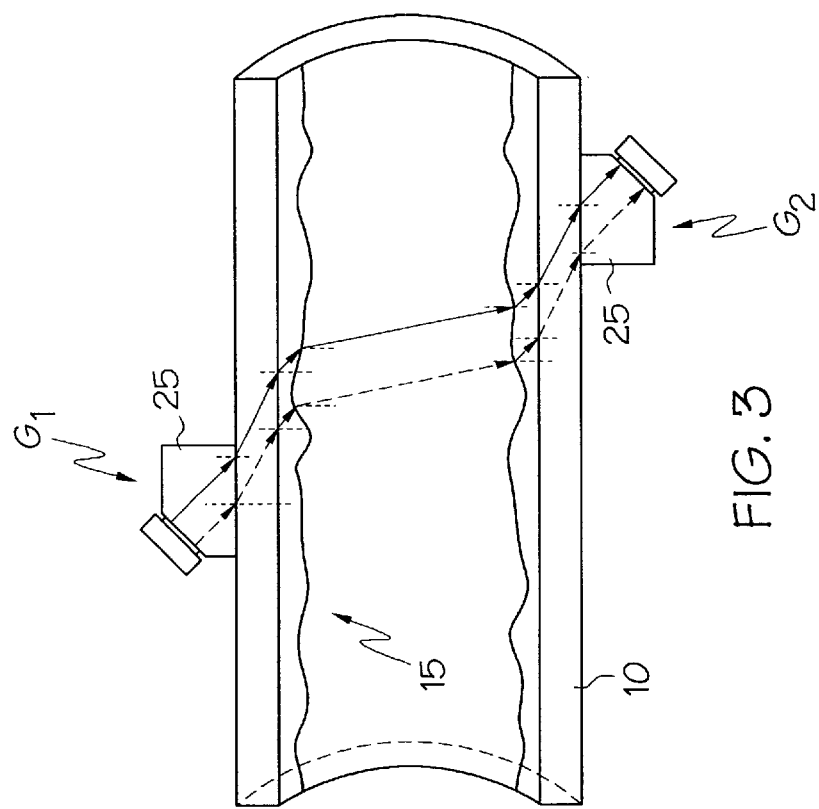
FIG. 3 illustrates a set of gas phase transducers arranged according to the present invention.

A variety of ultrasonic transducers may be utilized in accordance with the present invention. Typically, the design requirements for the gas phase transducers will differ from the design requirements of the liquid phase transducers. For example, referring to FIG. 3, a set of gas phase transducers $G_1$, $G_2$ may be arranged as illustrated and may be provided with respective acrylic wedges 25 to aid in directing the ultrasonic signals produced thereby. Also illustrated in FIG. 3 is the pipeline 10 and an annular liquid film 15. The gas phase transducers $G_1$, $G_2$ are preferably spaced and angled in accordance with Snell's Law to ensure proper alignment of the transducers, relative to the signals transmitted thereby.

Figure 4:
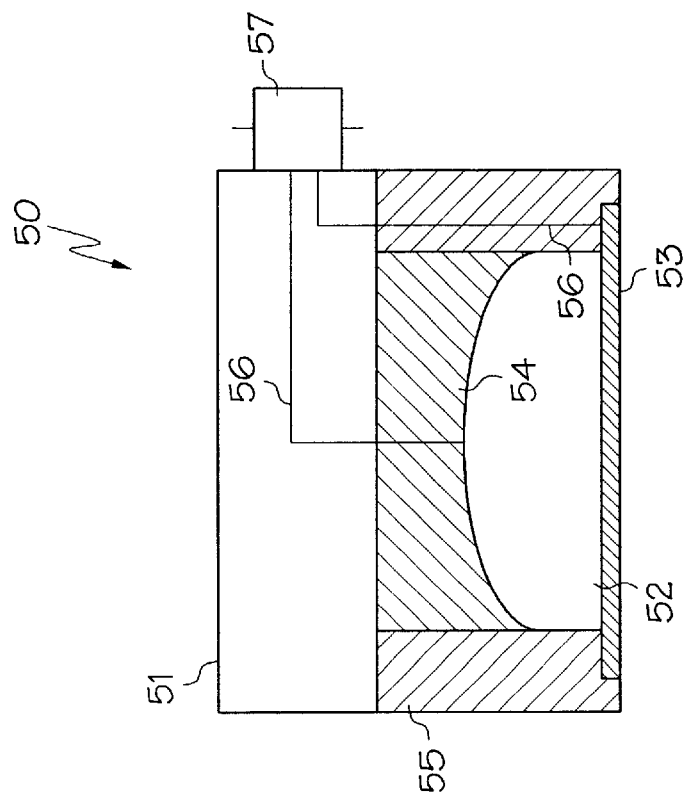
FIG. 4 illustrates a suitable liquid phase transducer according to the present invention.

A suitable liquid phase transducer 50 is illustrated in FIG. 4 and comprises a metal, ceramic, or plastic housing 51 enclosing a piezoelectric material 52, e.g., lead zirconate, lead titanate, lead meta-niobate, or any other piezoelectric material. The front face of the housing 51 comprises a transducer protective layer 53 to which the piezoelectric material 52 is bonded. The protective layer 53 may comprise hard alumina, tungsten carbide, or other durable materials. A transducer damping material 54 is bonded with epoxy or cement to the rear face of the piezoelectric material 52 and comprises rubber, powder metals, or other high impedance ultrasonic absorptive materials. An encapsulation material 55 is provided to secure the piezoelectric material 52 within the housing 51. Electric leads 56 and a coaxial connector 57 are also illustrated schematically in FIG. 4.

Figure 5:
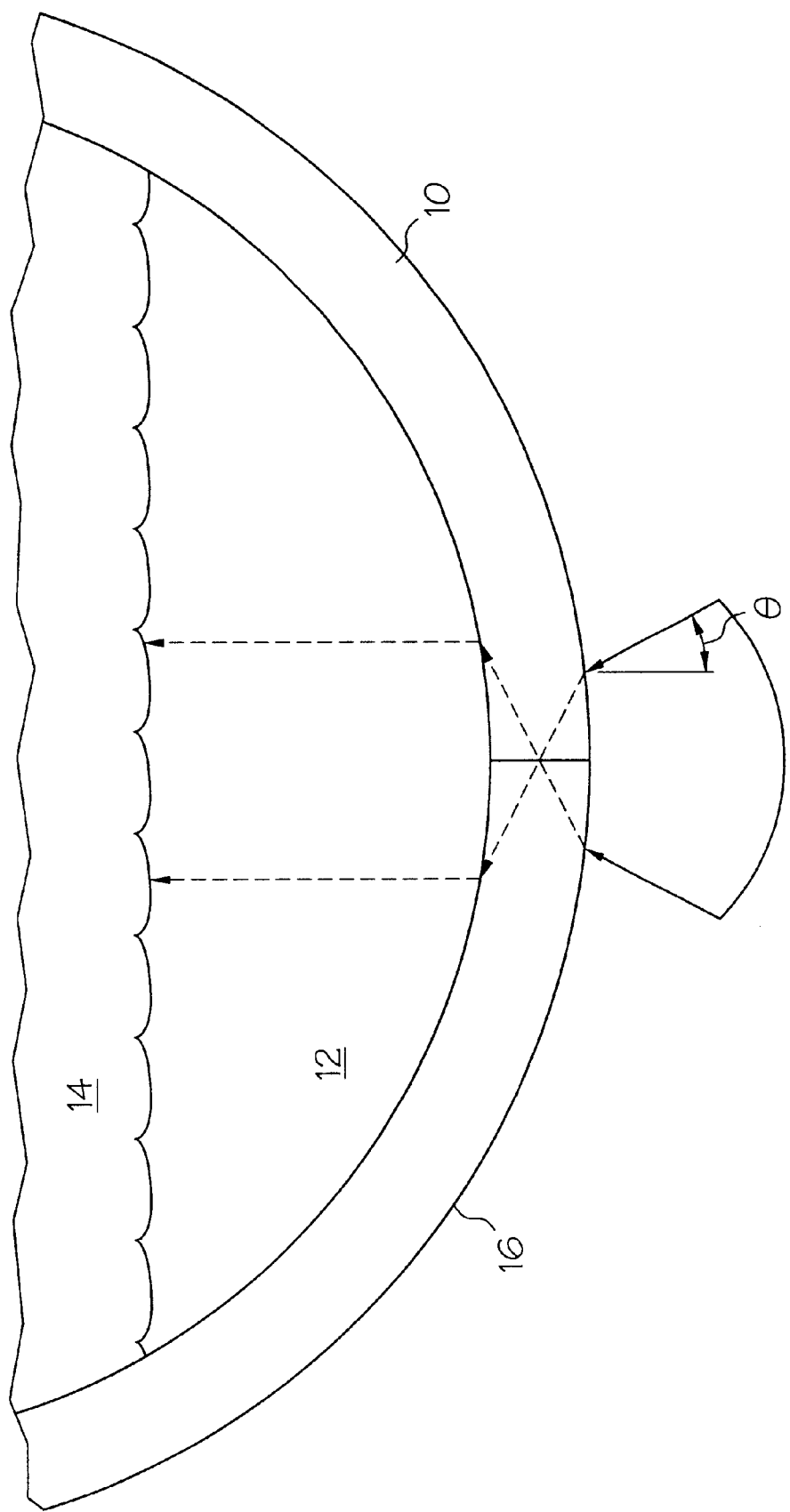
FIG. 5 illustrates an alternative liquid phase transducer according to the present invention.

According to one embodiment of the present invention, as is illustrated in FIG. 5, selected liquid phase transducers are arranged such that the ultrasonic waves are launched at an angle $\theta$ relative to a projection perpendicular to a tangent of the exterior 10 surface 16 of the pipeline 10. In this manner, signals reflected at the wall/liquid interface are directed away from the transducer $L_1$. The value of the angle $\theta$ is defined by the geometrical arrangement of the transducer itself and is selected such that the wall 60 is in the a focal region of the of the ultrasonic wave generated by the transducer $L_1$ and such that the ultrasonic wave is roughly perpendicular to the surface of the liquid film 12. According to one embodiment of the present invention, where the pipeline 10 is a 10 cm diameter, 0.6 cm thick steel pipe, the angle $\theta$ is approximately 21.5°.

Having described the invention in detail and by reference to preferred embodiments thereof, it will be apparent that modifications and variations are possible without departing from the scope of the invention defined in the appended claims.

What is claimed is:

1. A method of determining gas and liquid flow rates in a multi-phase flow utilizing a set of gas phase ultrasonic transducers and a set of liquid phase ultrasonic transducers positioned to direct ultrasonic signals through said multi-phase flow, said method comprising the steps of, establishing a set of gas phase control parameters and a gas phase algorithm for determining a flow rate of a gaseous portion of said multi-phase flow, wherein
said gas phase control parameters define a gas phase ultrasonic signal characterized by a gas phase center frequency and a gas phase bandwidth and
said gas phase algorithm comprises at least one of a gas phase transit time algorithm and a gas phase cross correlation algorithm and wherein said gas phase algorithm is established said gas phase cross correlation algorithm over said gas phase transit time algorithm as a function of an amount of liquid in said multi-phase flow;

establishing a set of liquid phase control parameters and a liquid phase algorithm for determining a flow rate of a liquid portion of said multi-phase flow, wherein
said set of liquid phase control parameters are established separately from said set of gas phase control parameters and
said liquid phase control parameters define a liquid phase ultrasonic signal characterized by a liquid phase center frequency and a liquid phase bandwidth and
said liquid phase algorithm comprises a liquid phase cross correlation algorithm;
controlling said gas phase ultrasonic transducers according to said gas phase control parameters so as to transmit said gas phase ultrasonic signal;
analyzing said gas phase ultrasonic signal according to said gas phase algorithm;
controlling said liquid phase ultrasonic transducers according to said liquid phase control parameters so as to transmit a liquid phase ultrasonic signal, wherein said liquid phase ultrasonic transducers am controlled separately from said gas phase ultrasonic transducers;
analyzing said liquid phase ultrasonic signal according to said liquid phase algorithm; and
determining said gas and liquid flow rates based upon said analyses of said gas phase ultrasonic signal and said liquid phase ultrasonic signal.

2. A method of determining gas and liquid flow rates in a multi-phase flow as claimed in claim 1 further comprising the steps of:
establishing said gas phase control parameters for a plurality of sets of said gas phase ultrasonic transducers such that said gas phase control parameters define a plurality of gas phase ultrasonic signals;
establishing said liquid phase control parameters for a plurality of sets of said liquid phase ultrasonic transducers such that said liquid phase control parameters define a plurality of liquid phase ultrasonic signals; and
analyzing said gas phase and said liquid phase ultrasonic signals with the aid of an ultrasonic data selection terminal, wherein said ultrasonic data selection terminal is controlled so as to establish a dwell time for each set of said plurality of sets of ultrasonic transducers.

3. A method of determining gas and liquid flow rates in a multi-phase flow as claimed in claim 2 wherein said dwell time is between about one second and about five seconds.

4. A method of determining gas and liquid flow rates in a multi-phase flow as claimed in claim 1 further comprising the step of establishing said gas phase control parameters for a plurality of sets of said gas phase ultrasonic transducers such that said gas phase control parameters define a plurality of gas phase ultrasonic signals.

5. A method of determining gas and liquid flow rates in a multi-phase flow as claimed in claim 4 further comprising the step of analyzing said gas phase ultrasonic signals with the aid of an ultrasonic data selection terminal, wherein said ultrasonic data selection terminal is controlled so as to establish a dwell time for each set of said plurality of sets of said gas phase ultrasonic transducers.

6. A method of determining gas and liquid flow rates in a multi-phase flow as claimed in claim 5 wherein said dwell time is between about one second and about five seconds.

7. A method of determining gas and liquid flow rates in a multi-phase flow as claimed in claim 1 further comprising the step of establishing said liquid phase control parameters for a plurality of sets of said liquid phase ultrasonic transducers such that said liquid phase control parameters define a plurality of liquid phase ultrasonic signals.

8. A method of determining gas and liquid flow rates in a multi-phase flow as claimed in claim 7 further comprising the step of analyzing said liquid phase ultrasonic signals with the aid of an ultrasonic data selection terminal, wherein said ultrasonic data selection terminal is controlled so as to establish a dwell time for each set of said plurality of sets of said liquid phase ultrasonic transducers.

9. A method of determining gas and liquid flow rates in a multi-phase flow as claimed in claim 8 wherein said dwell time is between about one second and about five seconds.

10. A method of determining gas and liquid flow rates in a multi-phase flow as claimed in claim 1 further comprising the step of analyzing said liquid phase ultrasonic signals according to a plurality of liquid phase algorithms with the aid of an ultrasonic data selection terminal, wherein said ultrasonic data selection terminal is controlled so as to establish a dwell time for each algorithm of said plurality of liquid phase algorithms.

11. A method of determining gas and liquid flow rates in a multi-phase flow as claimed in claim 1 further comprising the step of analyzing said gas phase ultrasonic signals according to a plurality of gas phase algorithms with the aid of an ultrasonic data selection terminal, wherein said ultrasonic data selection terminal is controlled so as to establish a dwell time for each algorithm of said plurality of gas phase algorithms.

12. A method of determining gas and liquid flow rates in a multi-phase flow as claimed in claim 1 further comprising the step of analyzing said liquid phase ultrasonic signals according to a plurality of sets of liquid phase control parameters with the aid of an ultrasonic data selection terminal, wherein said ultrasonic data selection terminal is controlled so as to establish a dwell time for each set of said plurality of sets of liquid phase control parameters.

13. A method of determining gas and liquid flow rates in a multi-phase flow as claimed in claim 1 further comprising the step of analyzing said gas phase ultrasonic signals according to a plurality of sets of gas phase control parameters with the aid of an ultrasonic data selection terminal, wherein said ultrasonic data selection terminal is controlled so as to establish a dwell time for each set of said plurality of sets of gas phase control parameters.

14. A method of determining gas and liquid flow rates in a multi-phase flow as claimed in claim 1 wherein said method further comprises the step of establishing said set of liquid phase control parameters and said liquid phase algorithm for determining a film thickness of said liquid portion of said multi-phase flow, and wherein said liquid phase algorithm further comprises a liquid phase pulse echo mode algorithm.

15. A method of determining gas and liquid flow rates in a multi-phase flow as claimed in claim 1 wherein said step of establishing said gas phase algorithm is characterized by a preference for said gas phase cross correlation algorithm over said gas phase transit time algorithm as an amount of liquid in said multi-phase flow increases.

16. A method of determining gas and liquid flow rates in a multi-phase flow as claimed in claim 1 wherein:
said multi-phase flow is contained within a pipeline;
said gas phase ultrasonic signal is transmitted by coupling said set of gas phase ultrasonic transducers to an exterior surface of said pipeline; and
said liquid phase ultrasonic signal is transmitted by coupling said set of liquid phase ultrasonic transducers to said exterior surface of said pipeline.

17. A method of determining gas and liquid flow rates in a multi-phase flow as claimed in claim 1 wherein:
said multi-phase flow is contained within a pipeline;
said gas phase ultrasonic signal is transmitted by coupling said set of gas phase ultrasonic transducers to an exterior surface of said pipeline;
said set of gas phase ultrasonic transducers comprise at least one upstream gas phase ultrasonic transducer and at least one downstream gas phase ultrasonic transducer positioned on opposite sides of a central longitudinal axis of said pipeline;
said liquid phase ultrasonic signal is transmitted by coupling said set of liquid phase ultrasonic transducers to an exterior surface of said pipeline;
said set of liquid phase ultrasonic transducers comprise at least one upstream of liquid phase ultrasonic transducer and at least one downstream liquid phase ultrasonic transducer positioned on a common side of said central longitudinal axis of said pipeline.

18. A method of determining gas and liquid flow rates in a multi-phase flow as claimed in claim 1 wherein:
said multi-phase flow is contained within a pipeline;
said gas phase ultrasonic signal is transmitted by coupling said set of gas phase ultrasonic transducers to an exterior surface of said pipeline;
said set of gas phase ultrasonic transducers comprise at least one upstream gas phase ultrasonic transducer and at least one downstream gas phase ultrasonic transducer positioned on a common side of a central longitudinal axis of said pipeline;
said liquid phase ultrasonic signal is transmitted by coupling said set of liquid phase ultrasonic transducers to an exterior surface of said pipeline;
said set of liquid phase ultrasonic transducers comprise at least one upstream liquid phase ultrasonic transducer and at least one downstream liquid phase ultrasonic transducer positioned on a common side of said central longitudinal axis of said pipeline.

19. A method of determining gas and liquid flow rates in a multi-phase flow as claimed in claim 1 wherein a value of said gas phase center frequency represents a compromise between unacceptable signal divergence at frequencies below or near 100 kHz and unacceptable signal attenuation at frequencies above or near 1 MHz.

20. A method of determining gas and liquid flow rates in a multi-phase flow as claimed in claim 1 wherein said gas phase control parameters are established such that said gas phase center frequency is about 500 kHz and said gas phase bandwidth is about 300 kHz.

21. A method of determining gas and liquid flow rates in a multi-phase flow as claimed in claim 1 wherein said gas phase control parameters are established such that said gas phase center frequency is above about 225 kHz and below about 1 MHz.

22. A method of determining gas and liquid flow rates in a multi-phase flow as claimed in claim 1 wherein said gas phase control parameters are established such that said gas phase center frequency is about 500 kHz.

23. A method of determining gas and liquid flow rates in a multi-phase flow as claimed in claim 1 wherein said gas phase control parameters are established such that said gas phase bandwidth is above about 225 kHz.

24. A method of determining gas and liquid flow rates in a multi-phase flow as claimed in claim 1 wherein said gas phase control parameters are established such that said gas phase bandwidth is about 300 kHz.

25. A method of determining gas and liquid flow rates in a multi-phase flow as claimed in claim 1 wherein said liquid phase control parameters are established such that said liquid phase center frequency is between about 0.5 MHz and about 5 MHz.

26. A method of determining gas and liquid flow rates in a multi-phase flow as claimed in claim 1 wherein said liquid phase control parameters are established such that said liquid phase bandwidth is above about 300 kHz.

27. A method of determining gas and liquid flow rates in a multi-phase flow as claimed in claim 1 wherein said liquid phase control parameters are established such that said liquid phase bandwidth is about 30% to about 80% of said value of said liquid phase center frequency.

28. A method of determining gas and liquid flow rates in a multi-phase flow as claimed in claim 1 wherein said gas phase control parameters and said liquid phase control parameters are established such that said gas phase center frequency is less than said liquid phase center frequency.

29. A method of determining gas and liquid flow rates in a multi-phase flow as claimed in claim 1 wherein:
said gas phase control parameters are established such that said gas phase center frequency is about 500 kHz and said gas phase bandwidth is about 300 kHz;
said liquid phase control parameters are established such that said liquid phase center frequency is between about 0.5 MHz and about 5 MHz and said liquid phase bandwidth is about 500 kHz.

30. A method of determining gas and liquid flow rates in a multi-phase flow contained within a pipeline utilizing a plurality of sets of gas phase ultrasonic transducers and a plurality of sets of liquid phase ultrasonic transducers positioned to direct ultrasonic signals through said multi-phase flow, said method comprising the steps of:
establishing a set of gas phase control parameters for said sets of said gas phase ultrasonic transducers such that said gas phase control parameters define a plurality of gas phase ultrasonic signals;
establishing a gas phase algorithm for determining a flow rate of a gaseous portion of said multi-phase flow, wherein
said gas phase control parameters define gas phase ultrasonic signals characterized by respective gas phase center frequencies and gas phase bandwidths and
said gas phase algorithm comprises at least one of a gas phase transit time algorithm and a gas phase cross correlation algorithm, and wherein said gas phase algorithm is established as said gas phase cross correlation algorithm over said gas phase transit time algorithm as a function of an amount of liquid in said multi-phase flow,
establishing a set of liquid phase control parameters for of plurality of sets of said liquid phase ultrasonic transducers such that said liquid phase control parameters define a plurality of liquid phase ultrasonic signals;
establishing a liquid phase algorithm for determining a flow rate of a liquid portion of said multi-phase flow, wherein
said set of liquid phase control parameters are established separately from said set of gas phase control parameters and
said liquid phase control parameters define liquid phase ultrasonic signals characterized by respective liquid phase center frequencies and liquid phase bandwidths and said liquid phase algorithm comprises a liquid phase cross correlation algorithm;

coupling said set of gas phase ultrasonic transducers to an exterior surface of said pipeline, wherein said set of gas phase ultrasonic transducers comprise at least one upstream gas phase ultrasonic transducer and at least one downstream gas phase ultrasonic transducer;

controlling said gas phase ultrasonic transducers according to said gas phase control parameters so as to transit said gas phase ultrasonic signals;

analyzing said gas phase ultrasonic signals according to said gas phase algorithm with the aid of an ultrasonic data selection terminal, wherein said ultrasonic data selection terminal is controlled so as to establish a dwell time for each set of said plurality of sets of gas phase ultrasonic transducers;

coupling said set of liquid phase ultrasonic transducers to an exterior surface of said pipeline wherein said set of liquid phase ultrasonic transducers comprise at least one upstream liquid phase ultrasonic transducer and at least one downstream liquid phase ultrasonic transducer;

controlling said liquid phase ultrasonic transducers according to said liquid phase control parameters so as to transmit said liquid phase ultrasonic signals, wherein said liquid phase ultrasonic transducers are controlled separately from said gas phase ultrasonic transducers;

analyzing said liquid phase ultrasonic signals according to said liquid phase algorithm with the aid of said ultrasonic data selection terminal, wherein said ultrasonic data selection terminal is controlled so as to establish a dwell time for each set of said plurality of sets of liquid phase ultrasonic transducers; and determining said gas and liquid flow rates based upon said analyses of said gas phase ultrasonic signals and said liquid phase ultrasonic signals.

31. A system for determining gas and liquid flow rates in a multi-phase flow contained within a pipeline, said system comprising:

a plurality of sets of gas phase ultrasonic transducers coupled to an exterior surface of said pipeline, wherein said set of gas phase ultrasonic transducers comprise at least one upstream gas phase ultrasonic transducer and at least one downstream gas phase ultrasonic transducer;

a plurality of sets of liquid phase ultrasonic transducers coupled to an exterior surface of said pipeline, wherein said set of liquid phase ultrasonic transducers comprise at least one upstream liquid phase ultrasonic transducer and at least one downstream liquid phase ultrasonic transducer; and a flow rate analyzer, wherein said flow rate analyzer is programmed to establish a set of gas phase control parameters for said plurality of sets of gas phase ultrasonic transducers such that said gas phase control parameters define a plurality of gas phase ultrasonic signals, establish a gas phase algorithm for determining a flow rate of a gaseous portion of said multi-phase flow, wherein said gas phase control parameters define gas phase ultrasonic signals characterized by respective gas phase center frequencies and gas phase bandwidths and said gas phase algorithm comprises at least one of a gas phase transit time algorithm and a gas phase cross correlation algorithm, and wherein said gas phase algorithm is established as said gas phase cross correlation algorithm over said gas phase transit time algorithm as a function of an amount of liquid in said multi-phase flow, establish a set of liquid phase control parameters for said plurality of sets of liquid phase ultrasonic transducers such that said liquid phase control parameters define a plurality of liquid phase ultrasonic signals;

establish a liquid phase algorithm for determining a flow rate of a liquid portion of said multi-phase flow, wherein said set of liquid phase control parameters are established separately from said set of gas phase control parameters and said liquid phase control parameters define liquid phase ultrasonic signals characterized by respective liquid phase center frequencies and liquid phase bandwidths and said liquid phase algorithm comprises a liquid phase cross correlation algorithm;

control said gas phase ultrasonic transducers according to said gas phase control parameters so as to transmit said gas phase ultrasonic signals;

analyze said gas phase ultrasonic signals according to said gas phase algorithm with the aid of an ultrasonic data selection terminal, wherein said ultrasonic data selection terminal is controlled so as to establish a dwell time for each set of said plurality of sets of gas phase ultrasonic transducers;

control said liquid phase ultrasonic transducers according to said liquid phase control parameters so as to transmit said liquid phase ultrasonic signals, wherein said liquid phase ultrasonic transducers are controlled separately from said gas phase ultrasonic transducers;

analyze said liquid phase ultrasonic signals according to said liquid phase algorithm with the aid of said ultrasonic data selection terminal, wherein said ultrasonic data selection terminal is controlled so as to establish a dwell time for each set of plurality of sets of liquid phase ultrasonic transducers; and determine said gas and liquid flow rates based upon said analyses of said gas phase ultrasonic signals and said liquid phase ultrasonic signals.

32. A method of determining gas and liquid flow rates in a multi-phase flow utilizing a set of gas phase ultrasonic transducers and a set of liquid phase ultrasonic transducers positioned to direct ultrasonic signals through said multi-phase flow, said method comprising the steps of:

establishing a set of gas phase control parameters and a gas phase algorithm for determining a flow rate of a gaseous portion of said multi-phase flow, wherein said gas phase control parameters define a gas phase ultrasonic signal characterized by a gas phase center frequency and a gas phase bandwidth and said gas phase algorithm comprises at least one of a gas phase transit time algorithm and a gas phase cross correlation algorithm;

establishing a set of liquid phase control parameters and a liquid phase algorithm for determining the flow rate of a liquid portion of said multi-phase flow, wherein said set of liquid phase control parameters are established separately from said set of gas phase control parameters and said liquid phase control parameters define a liquid phase ultrasonic signal characterized by a liquid phase center frequency and a liquid phase bandwidth and said liquid phase algorithm comprises a liquid phase cross correlation algorithm, and wherein said gas phase algorithm is established as said gas phase cross correlation algorithm over said gas phase transmit time algorithm as an amount of liquid in said multi-phase flow increases;

controlling said gas phase ultrasonic transducers according to said gas phase control parameters so as to transmit said gas phase ultrasonic signal;

analyzing said gas phase ultrasonic signal according to said gas phase algorithm;

controlling said liquid phase ultrasonic transducers according to said liquid phase control parameters so as to transmit a liquid phase ultrasonic signal, wherein said liquid phase ultrasonic transducers are controlled separately from said gas phase ultrasonic transducers;

analyzing said liquid phase ultrasonic signal according to said liquid phase algorithm; and determining said gas and liquid flow rates based upon said analyses of said gas phase ultrasonic signal and said liquid phase ultrasonic signal.

* * * * *

UNITED STATES PATENT AND TRADEMARK OFFICE
CERTIFICATE OF CORRECTION

PATENT NO. : 6,502,465 B1  Page 1 of 1
DATED : January 7, 2003
INVENTOR(S) : Vedapuri et al.

It is certified that error appears in the above-identified patent and that said Letters Patent is hereby corrected as shown below:

Column 10,
Line 54, "the steps of," should be -- the steps of: --;
Line 63, "correlation algorithm and" should be -- correlation algorithm, and --;

Column 11,
Line 21, "transducers am controlled" should be -- transducers are controlled --;

Column 13,
Line 16, "upstream of liquid phase" should be -- upstream liquid-phase --;

Column 14,
Line 53, "multi-phase flow," should be -- multi-phase flow; --;
Line 54, "parameters for of plurality of sets" should be -- parameters of said plurality of sets --;

Column 15,
Line 9, "so as to transit said gas" should be -- so as to transmit said gas --;

Column 16,
Line 39, "set of plurality of sets" should be -- set of said plurality of sets --;
Line 59, "for determining the flow rate" should be -- for determining a flow rate --; and Column 17,
Line 4, "gas phase transmit time" should be -- gas phase transit time --.

Signed and Sealed this

Fifteenth Day of July, 2003

JAMES E. ROGAN
*Director of the United States Patent and Trademark Office*